(12) United States Patent
Kawamura et al.

(10) Patent No.: US 6,745,276 B2
(45) Date of Patent: Jun. 1, 2004

(54) COMMUNICATION METHOD AND APPARATUS

(75) Inventors: Harumi Kawamura, Tokyo (JP); Mari Horiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 518 days.

(21) Appl. No.: 09/730,524

(22) Filed: Dec. 5, 2000

(65) Prior Publication Data

US 2001/0054069 A1 Dec. 20, 2001

(30) Foreign Application Priority Data

Dec. 7, 1999 (JP) .......................................... P11-347989

(51) Int. Cl.[7] .............................................. G06F 13/00
(52) U.S. Cl. ....................................... 710/313; 709/213
(58) Field of Search ................................. 710/100, 107, 710/305, 306, 313; 709/204, 213, 214, 215, 216, 312, 313

(56) References Cited

U.S. PATENT DOCUMENTS 6,131,111 A * 10/2000 Yoshino et al. ............. 709/204
6,363,434 B1 * 3/2002 Eytchison ................... 709/313
6,434,596 B1 * 8/2002 Ludtke et al. ............... 709/213

* cited by examiner

Primary Examiner—Glenn A. Auve
(74) Attorney, Agent, or Firm—Jay H. Maioli

(57) ABSTRACT

Communication method and apparatus for allowing restriction-free transmission of various kinds of information, such as control information, among devices constituting, for example, an IEEE 1394 network. At least one of the network-linked devices is provided with a storage region to/from which data can be written/read out by any other device on the network upon transmission of a predetermined command, so that data can be transmitted throughout the network by using the storage region.

6 Claims, 8 Drawing Sheets

FIG. 3

[The General SUBUNIT Identifier Descriptor]

| Address | Content |
|---|---|
| 00 00₁₆ | descriptor length |
| 00 01₁₆ | generation ID |
| 00 02₁₆ | size of list ID |
| 00 03₁₆ | size of object ID |
| 00 04₁₆ | size of object position |
| 00 05₁₆ | number of root object list(n) |
| 00 06₁₆ | root object list id 0 |
| 00 07₁₆ | ... |
| 00 08₁₆ | root object list id n-1 |
| ... | subunit dependent information length |
| | subunit dependent information |
| | manufacturer dependent length |
| | manufacturer dependent information |

[Bulletin Board Subunit dependent information field]

| Address Offset | Content |
|---|---|
| 00₁₆ | non info block fields length |
| 01₁₆ | Bulletin Board Subunit version |
| 02₁₆ | implementation profile ID |
| 03₁₆ | number of supported board types(n) |
| 04₁₆ | supported board type specific information length[0] |
| 05₁₆ | supported board type specific information[0] |
| 06₁₆ | supported board type specific information length[n-1] |
| 07₁₆ | supported board type specific information[n-1] |
| ... | optional info blocks for future expansion |

[Supported board type specific information field]

| Address Offset | Content |
|---|---|
| 00₁₆ | supported board type |
| 01₁₆ | supported board type version |
| 02₁₆ | supported board type dependent information length |
| 03₁₆ | supported board type dependent information |
| 04₁₆ | ... |

FIG. 6

| | msb | | | | | | lsb |
|---|---|---|---|---|---|---|---|
| opcode | \multicolumn{7}{l|}{WRITE DESCRIPTOR(0A16)} |
| operand[0] | descriptor identifier(MBS) | | | | | | |
| operand[1] | : | | | | | | |
| : | : | | | | | | |
| : | (LBS) | | | | | | |
| : | sub function | | | | | | |
| : | group tag | | | | | | |
| : | data length(MSB) | | | | | | |
| : | (LSB) | | | | | | |
| : | address(MSB) | | | | | | |
| : | (LSB) | | | | | | |
| : | data | | | | | | |
| : | | | | | | | |

FIG. 7

| | msb | | | | | | lsb |
|---|---|---|---|---|---|---|---|
| opcode | READ DESCRIPTOR(0916) | | | | | | |
| operand[0] | descriptor identifier(MBS) | | | | | | |
| operand[1] | : | | | | | | |
| : | : | | | | | | |
| : | (LBS) | | | | | | |
| : | read result status | | | | | | |
| : | data length(MSB) | | | | | | |
| : | (LSB) | | | | | | |
| : | address(MSB) | | | | | | |
| : | (LSB) | | | | | | |

COMMUNICATION METHOD AND APPARATUS

BACKGROUND OF THE INVENTION

1. Field of the Invention

The present invention relates to a communication method and apparatus adapted to data communications among devices that are interconnected via an IEEE 1394 bus line, for example.

2. Description of the Related Art

There have been developed AV devices for mutually transmitting information through a network employing an IEEE 1394 serial data bus. When transmitting data via the foregoing bus, an isochronous transfer mode used in transmitting a relatively large volume of video data, audio data, etc. in real time and an asynchronous transfer mode used in transmitting a still image, text data, a control command, etc. in a reliable manner are available, and a specific bandwidth is used for transmission in each mode.

According to the transmission structure employing the IEEE 1394 bus, when a source device as a device for sending data, a destination device as a device for receiving the data sent from the source device, and a controller for controlling data transmission between these two devices are linked to the IEEE 1394 bus, the data is transmitted from the source device to the destination device under the control of the controller. More specifically, in case of sending video data from the source device to the destination device, the controller secures an isochronous transfer channel on the bus, and establishes a connection between the source device and destination device to enable transmission through the secured channel, after which the controller starts the transmission from the source device to the destination device.

When the data is transmitted between the source device and destination device in the above manner, a control command transmission method called AV/C command (AV/C Digital Interface Command Set) that is adapted to the audio and video devices (so-called AV devices) or the like can be used, for example. The AV/C command is disclosed in detail in the home page at http://www.1394TA.org.

Incidentally, in a network where transmission can be controlled by the conventional AV/C command, it is necessary to specify the type of information that is read out from and written to each device linked to the bus. For example, in case that data is transmitted between the foregoing source device and destination device under the control of the controller, it is necessary to pre-install a function for running an assigned job to each device linked to the bus.

When information transmitted between the devices has to be specified in advance as described above, functions realized by these devices are limited to the pre-installed functions. This is not preferable when flexibility of the data transmission on the network, expansion of the functions, etc. are concerned.

SUMMARY OF THE INVENTION

It is therefore an object of the present invention to realize transmission of various kinds of information, such as control information, among devices constituting, for example an IEEE 1394 network.

A communication method of the present invention is a communication method for allowing communications among devices linked to a predetermined network, wherein: at least one of the devices linked to the network is provided with a storage region to/from which data is written/read out when a predetermined command is transmitted from any other device on the network; and data transmission throughout the network is allowed by using the storage region.

A communication apparatus of the present invention is a communication apparatus linked to a predetermined network, comprising:
control means for controlling communications with any other device within the network; and a storage unit to/from which data is written/read out at a command from any other device within the network judged by the control means.

By adapting the above inventions, arbitrary data can be written/read out to/from a predetermined storage region in at least one network-linked device under the control of the other devices. Thus, information related to an arbitrary function can be written to the storage region by the other devices, or the information on the function needed by the other devices can be read out from the storage region.

BRIEF DESCRIPTION OF THE DRAWINGS

FIG. 3 is an explanatory diagram showing an example of a data structure of a white board section in accordance with one embodiment of the present invention;

FIG. 6 is an explanatory diagram showing an example of a write command in accordance with one embodiment of the present invention;

FIG. 7 is an explanatory diagram showing an example of a read command in accordance with one embodiment of the present invention;

DETAILED DESCRIPTION OF THE PREFERRED EMBODIMENTS

Figure 1:
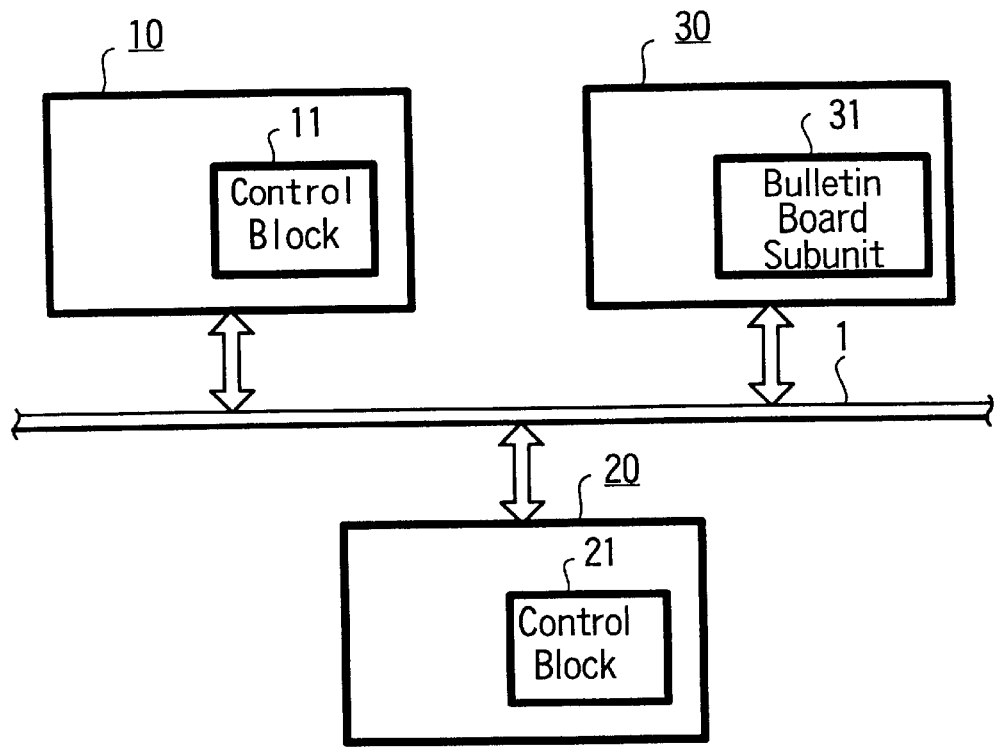
FIG. 1 is a block diagram showing an example of a system structure in accordance with one embodiment of the present invention.

The following description will describe one embodiment of the present invention with reference to the accompanying drawings.

Firstly, an example of a network system structure to which the present invention is applied will be explained with reference to FIG. 1. In this network system, a plurality of devices are interconnected via an IEEE 1394 serial data bus 1. In the drawing, only the devices (first, second, and third devices 10, 20, and 30) necessary to explain the procedures in the present embodiment are shown but, actually, up to the prescribed number of devices such as AV devices of various types can be linked to the bus 1. The devices linked to the bus 1 transmit data to each other or control the other devices by way of transmission of a control command based on the AV/C command.

Examples of the AV devices linked to the bus 1 through their respective IEEE 1394 bus connectable terminals include: a digital video recording/reproducing apparatus, an IRD (Integrated Receiver Decoder), a television receiver, and an audio recording/reproducing apparatus, and optionally, a personal computer and peripherals. A block (for example, a block for processing video data or audio data) for actually effecting data processing is omitted in each of the devices 10, 20, and 30 shown in FIG. 1.

Herein, at least one of the devices linked to the bus 1 is furnished with a function to serve as a controller for controlling communications on the bus 1, and a command defined by the AV/C command is issued from this controller. Also, in the AV/C command, a device manipulated at a command from the controller is referred to as a target.

In case of the example shown in FIG. 1, the first device 10 and second device 20 are the devices that can function as the controller, and the third device 30 is the device that functions as the target. Thus, the first device 10 includes a control block 11 and the second device 20 also includes a control block 21, and each of the control blocks 11 and 21 executes processing to issue a command defined by the AV/C command. A command issued as a job result within either the control block 11 or 21 is sent to the bus 1, and then transmitted to the other devices linked to the bus 1, such as the third device 30. A function unit, such as the control block, provided to each device is referred to as the controller, and a function unit placed under the control of the controller is referred to as the subunit. Transmission of the command on the bus 1 is carried out in the asynchronous transfer mode.

The third device 30 functioning as the target includes a bulletin board unit 31 where data necessary for data transmission is stored. The bulletin board unit 31 is one of the subunits provided in the third device 30, and includes a storage unit for storing data, such as specifications as to by which hierarchical structure the data should be transmitted. The data stored in the storage unit is shared by any network-linked devices.

Figure 2:
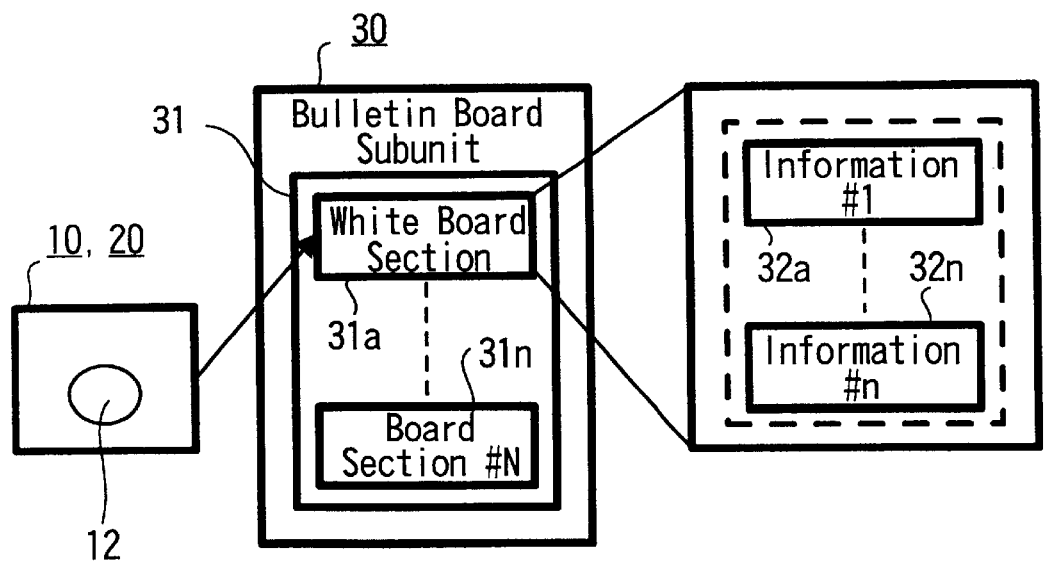
FIG. 2 is an explanatory diagram showing a model example of a white board system in accordance with one embodiment of the present invention.

More specifically, as shown in FIG. 2, for example, the bulletin board subunit 31 provided to the third device 30 includes a plurality of board sections 31a through 31n (n is an arbitrary integer), and data, such as specifications of the transmission data, is stored in each of the board sections 31a through 31n. One of these board sections within the bulletin board subunit 31 is a white board section 31a, and any other device linked to the bus 1 is allowed to read/write data from/to the white board section 31a without any restriction. Data written to the white board section 31a is expressed by the descriptor structure defined by the AV/C command, and reading and writing by the other devices are effected by using the AV/C command.

As shown in FIG. 2, the device (the first device 10 or second device 20 herein) that writes data to the white board section 31a is referred to as the owner device, and an information source 12 provided in the owner device 10 or 20 is written to the white board section 31a in the third device 30. The white board section 31a alone can store a plurality of information sources 31a through 31n (n is an arbitrary integer).

The white board section 31a shown in FIG. 2 is a region secured in advance in the third device 30, or alternatively a region secured within the bulletin board subunit upon transmission of a command from any other device (owner device or the like) on the bus.

FIG. 3 is a diagram showing an example data structure stored in the white board section 31a. As has been described, the white board section 31a stores data of the descriptor structure defined by the AV/C command, and a hexadecimal address is assigned to each predetermined unit of data. A format of the entire data is composed of one subunit called [Subunit Identifier Descriptor] shown in the left side in FIG. 3, which includes a descriptor specifying the characteristics of the subunit, and another descriptor specifying bulletin board data described below.

In this descriptor, [descriptor length] as the data specifying the data length of the entire descriptor is placed at the head, followed by [generation ID] as the data related to the version of the AV/C General Specification compatible to the standards the descriptor uses, [size of list ID] and [size of object ID] respectively specifying the sizes of the list ID and object ID, [size of object position] specifying the size of an object position, [number of root object list] specifying the number of the root object lists, [root object list id 0] through [root object list id n−1] as the IDs of the n lists for the root object, [subunit dependent information length] specifying the data length of the data related to the subunit, [subunit dependent information] as the data related to the subunit, [manufacturer dependent length] specifying the data length of data unique to the manufacture of each device, and [manufacturer dependent information] as the data unique to the manufacturer of each device.

Here, fixed values defined by the bulletin board unit are placed as the data for the list ID, object ID, and object position. The ID of the white board is placed in one of the [root object list ids] as the IDs of the lists. Here, [subunit dependent information] as the data related to the subunit is a field where the data structure is determined for each subunit, and in the present embodiment, it is the data of the bulletin board unit having the data structure of [Bulletin Board Subunit dependent information field] shown at the upper right in FIG. 3.

The following description will describe the data structure of the bulletin board unit of the present embodiment. This field additionally includes data of a block called Infoblock. Thus, in order to distinguish the Infoblock data from the other data, [non infoblock fields length] as the data specifying the data length of the blocks other than the Infoblock is placed at the head, followed by [Bulletin Board Subunit version] as the version information of the standards referred to by the device installed with the bulletin board unit (Bulletin Board Subunit), and [implementation profile ID] as the data specifying the level of the function installed in the device. Further, a set of [number of supported board types (n)] specifying the number (n) of the installed boards, [supported board type specific information length] and [supported board type specific information] respectively specifying the data length of the data related to the type of each installed board and the data per se is placed repetitively as many times as the number (n) of the boards. Also, a region at the end is secured for future expansion of the function.

Here, [implementation profile ID] as the data on the profile ID specifying the level of the function installed in the device may be arranged as follows. That is, for example, if more than one method is available to control the white board, each method is classified by the profile ID, so that the other controllers can distinguish one from the others.

In the field of [supported board type specific information] as the data for each board, as shown at the lower right in FIG. 3, [supported board type] as the board type data, [supported board type version] as the board type version data, [supported board type dependent information length] specifying the data length of the board data, and [supported board type dependent information] as a region where data is stored for each board type are placed.

Figure 4:
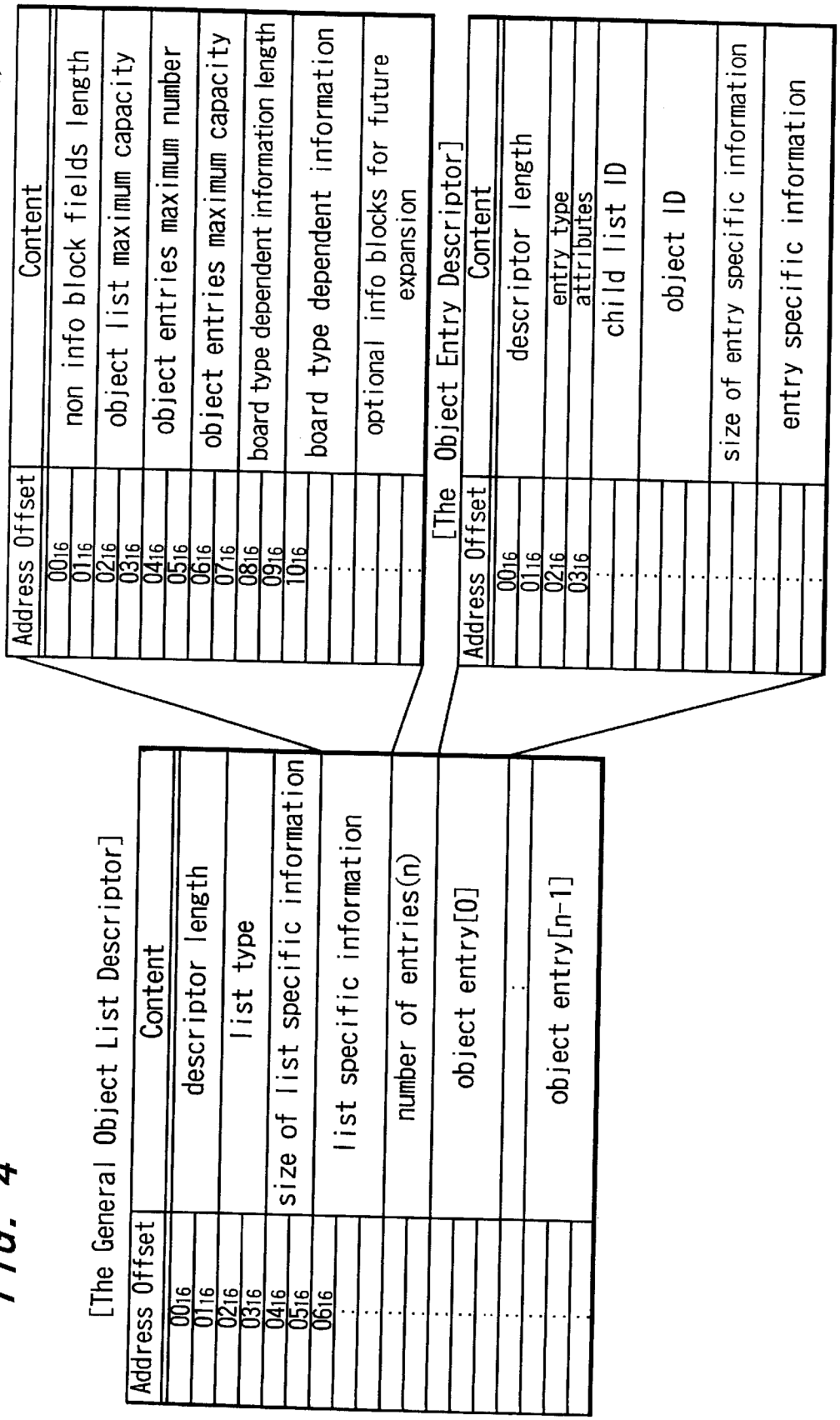
FIG. 4 is an explanatory diagram showing an example of data structure of a root list in accordance with one embodiment of the present invention.

Also, FIG. 4 shows data in [The General Object List descriptor] of the descriptor structure for the root list that is set in the bulletin board data. The descriptor structure of the root list shown in the left side in FIG. 4 uses the structure of a general root list in the AV/C command, in which [descriptor length] specifying the data length of the descriptor, [list type] as the data of the list type, [size of list specific information] specifying the size of the list, [list specific information] as the data of the list, [number of entries (n)] specifying the number [n] of entries, and [object entry] as the data of object entries prepared as many as the number of entries are placed.

Because data can be written to the white board of the present embodiment by the other devices, the list type shows [WRITE Enable] to indicate that writing is enabled, and the field of [list specific information] uses the type of [WRITE Enable] list.

At the upper right in FIG. 4, an example when the type of [WRITE Enable] list is used for the field of [list specific information] is shown. The data structure is explained as follows: [non infoblock fields length] as the data specifying the data length of the blocks other than the infoblock is placed at the head, followed by [object list maximum capacity] specifying the largest size of the list, [object entries maximum number] specifying the largest number of the objects handled within the list, and [object entries maximum capacity] specifying the largest data size (byte size) that each object can handle are placed sequentially. These three fields are the fields that set the target device readable by the other devices when the list specifies so; otherwise, "0" data is set in all these fields.

Subsequently, [board type dependent information length] specifying the data length of the field that determines the data structure for each board, and [board type dependent information] as the data in the field are placed. Here again, a region at the end is secured for future expansion of the function.

At the lower right in FIG. 4, a general example of data entered in the object entry within the list is shown. The data structure is explained as follows: [descriptor length] specifying the data length of the descriptor, [entry type] as the data of the entry type, [attributes] as the data on attributes to the object, [Child list ID] as the ID of the child list, [object ID] as the object ID, [size of entry specific information] as the data length of the information data, and [entry specific information] as the information data are placed.

Upon receipt of a data write request from the owner device or the like, the device having the white board within the bulletin board unit creates the field of the object entry shown at the lower right in FIG. 4 within the list descriptor.

Figure 5:
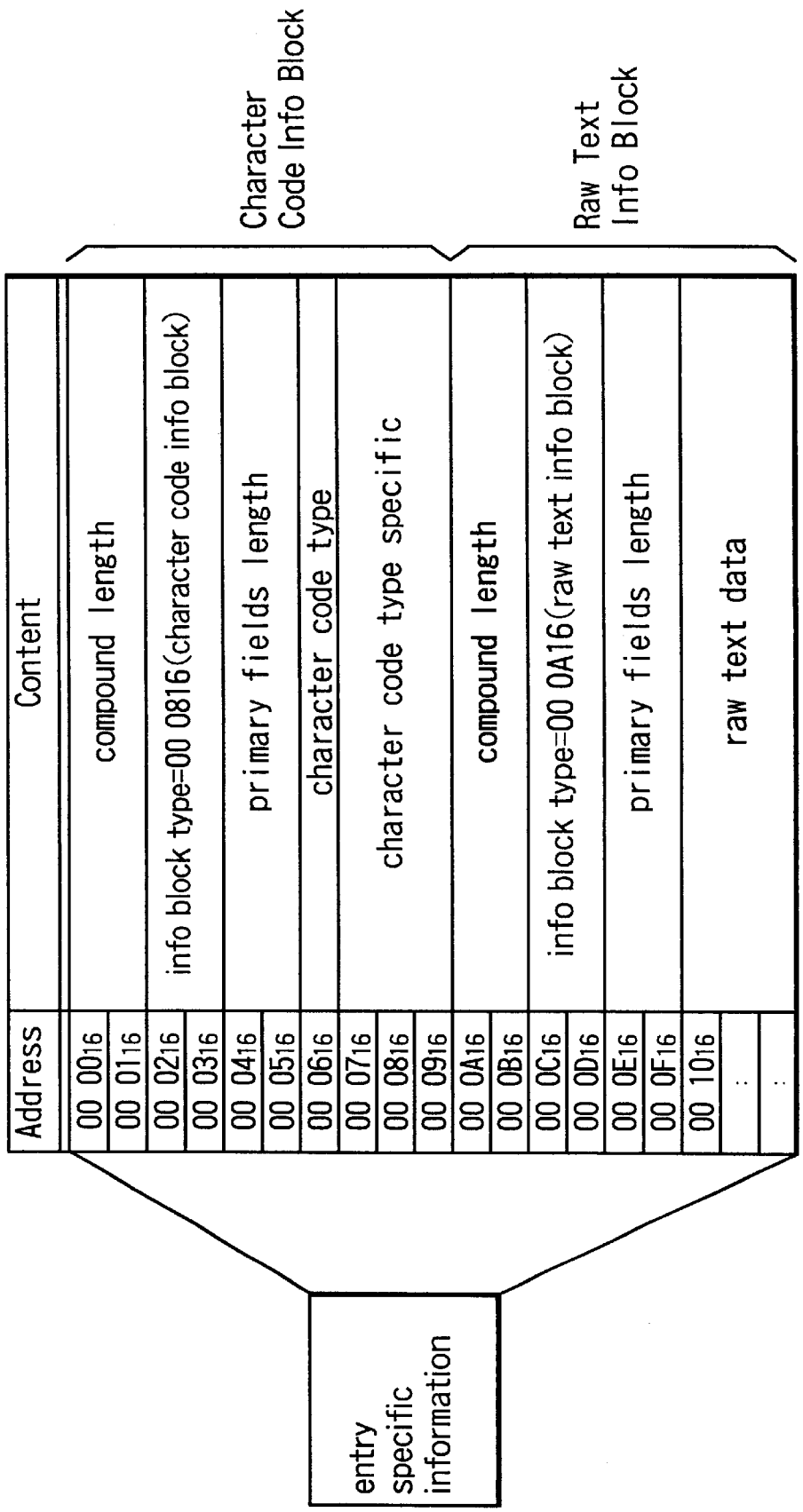
FIG. 5 is an explanatory diagram showing an example of a data structure of entry specific information in accordance with one embodiment of the present invention.

FIG. 5 is a diagram showing an example when data is written in the cell of [entry specific information]. Herein, [Character Code Info Block] as an information block of character code information, and [Raw Text Info Block] as an information block of raw text data are placed. In [Character Code Info Block], data of the character code type is placed besides the data related to the data length, infoblock type, and character code type. In [Raw Text Info Block], raw text data is placed besides the data related to the data length and infoblock type.

In the present embodiment, [Character Code Info Block] and [Raw Text Info Block] are placed as an example. It should be appreciated, however, that other blocks can be placed as well. For example, an information block of information used in displaying a figure, such as an icon, on the display screen may be placed.

The manipulation, including writing, reading, and root list generating jobs, of the white board section having the foregoing data structure is directed by the other devices at a command defined by the AV/C descriptor command. For example, a command defined by the standards referred to as the AV/C general specification is used. More specifically, a write command as shown in FIG. 6 is used as a command that directs a writing job, for example. In this write command, [WRITE DESCRIPTOR] is entered in the opcode to specify the writing job of descriptor, and [descriptor identifier] as the ID of the descriptor, [sub function] as the data of sub function, [group data] as the identifying data of the group, [data length] specifying the data length, and [address] specifying the writing address are placed sequentially in the regions beyond the operand [0] followed by [data] as the data to be written. By transmitting the write command, the transmitted data is written to the specified address in the white board section by the device that has received the write command.

Also, a read command as shown in FIG. 7 is used as a command directing a reading job, for example. In this read command, [READ DESCRIPTOR] is entered in the opcode to specify the reading job of the descriptor, and [descriptor identifier] as the ID of the descriptor, [read result status] as the data related to the reading status, [data length] specifying the data length, and [address] specifying the data reading address are placed sequentially in the regions beyond the operand [0]. By transmitting the read command, the data written in the specified address in the white board section is read out by the device that has received the command so as to be transmitted to the command issuer in the form of a response command.

The following description will describe the procedure for writing data to or reading out the written data from the white board section in the device (target device) by the other devices (controller devices) linked to the bus 1 by using the foregoing write command or read command.

Figure 8:
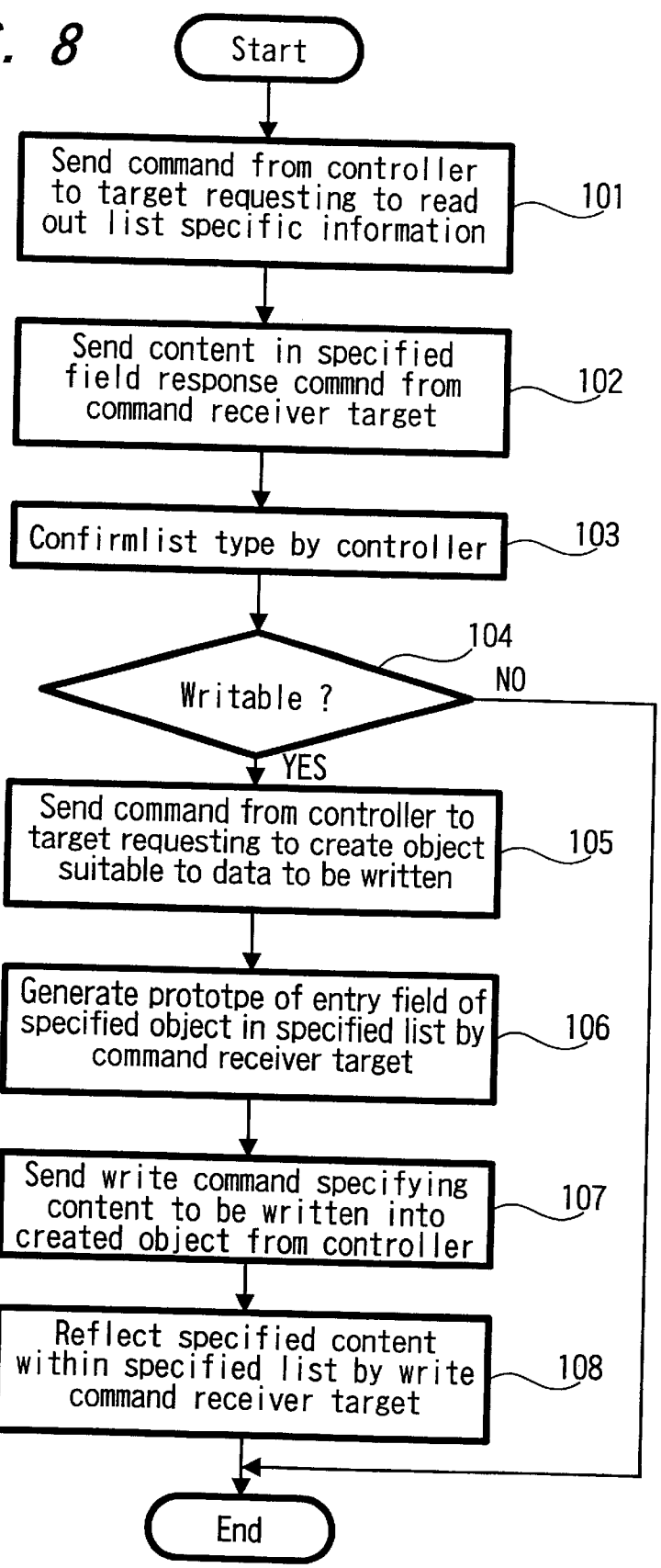
FIG. 8 is a flowchart showing an example of a write processing procedure to the white board section in accordance with one embodiment of the present invention.

In the first place, the following description will explain the job procedure for reading out the data written in the white board section in the target device by transmitting the write command from the controller device with reference to FIG. 8. The controller device sends a command to read out the field of [list specific information] within the list descriptor (see FIG. 4) of the target device (Step 101). Upon receipt of the command, the target device sends the content in the specified field in the form of the response command (Step 102). Upon receipt of the response command, the controller device confirms the list type of the board section in the target device (Step 103), and judges whether it is a data writable board section or not (that is, whether it is the white board section or not) (Step 104). When the board section is judged as non-writable, the writing job is terminated.

When the board section is judged as the writable white board section, the controller device sends a command to the target device, requesting to create an object suitable to the data to be written (Step 105). Upon receipt of such a command, the target device generates a prototype of the entry field of the specified object in the specified list (Step 106). Then, the controller device sends a write command specifying the content that should be written to the object thus created (Step 107). This write command is a command having the same structure as that shown in FIG. 6, for example. Upon receipt of the write command, the target device reflects the specified content within the specified list, and terminates the writing job (Step 108).

Figure 9:
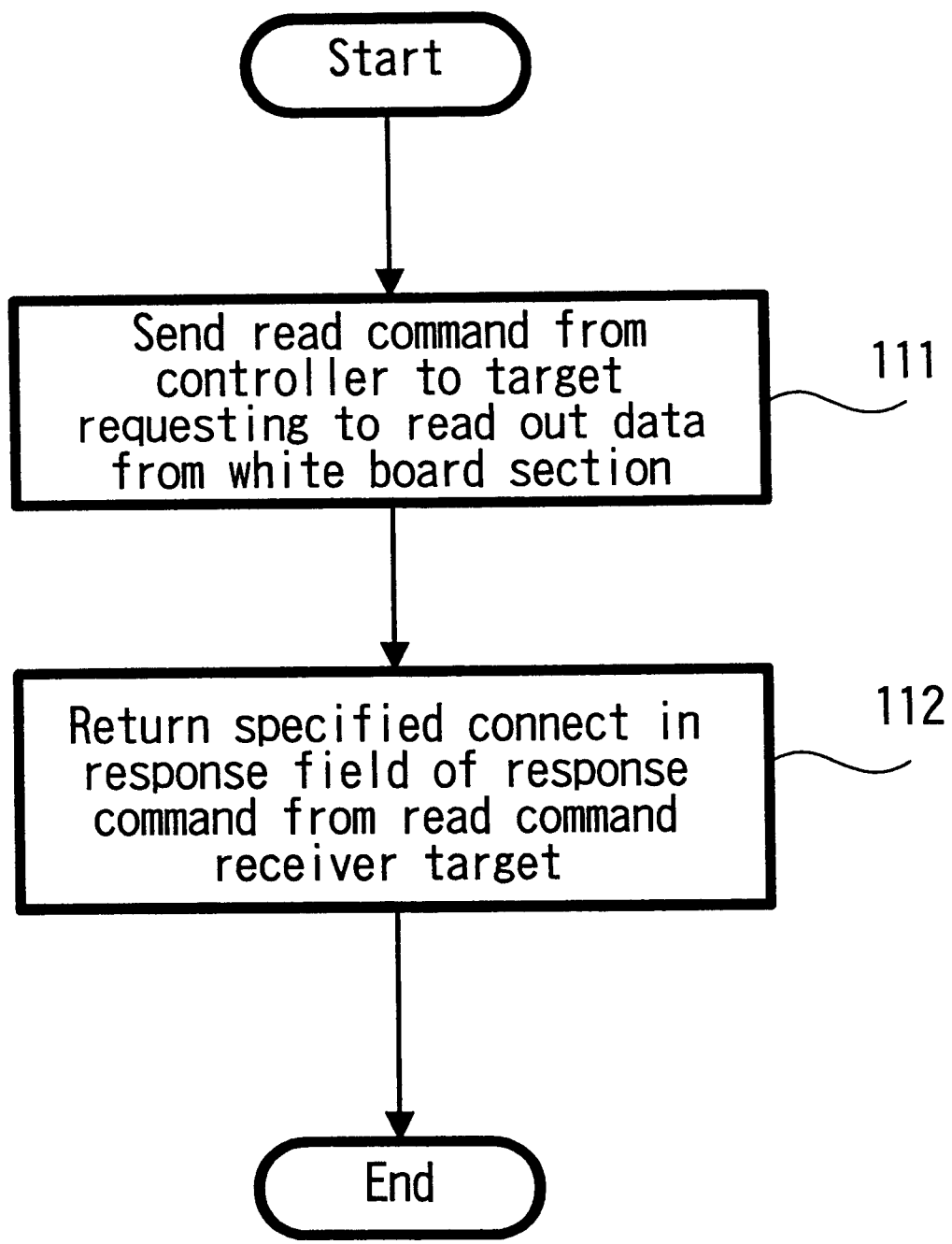
FIG. 9 is a flowchart showing an example of read processing procedure from the white board section in accordance with one embodiment of the present invention.

Next, the following description will describe the job procedure for reading the data written in the white board section in the target device by the controller device with reference to the flowchart in FIG. 9. The controller device sends a read command to the target device, requesting to read out specific data written in the white board section (step 111). The read command is a command having the same structure as that shown in FIG. 7, for example. Upon receipt of the read command, the target device places the data on the address specified by the command in the response field in the response command issued in return to the foregoing command, and returns the response command to the controller device (Step 112), whereupon the controller device terminates the reading job.

Figure 10:
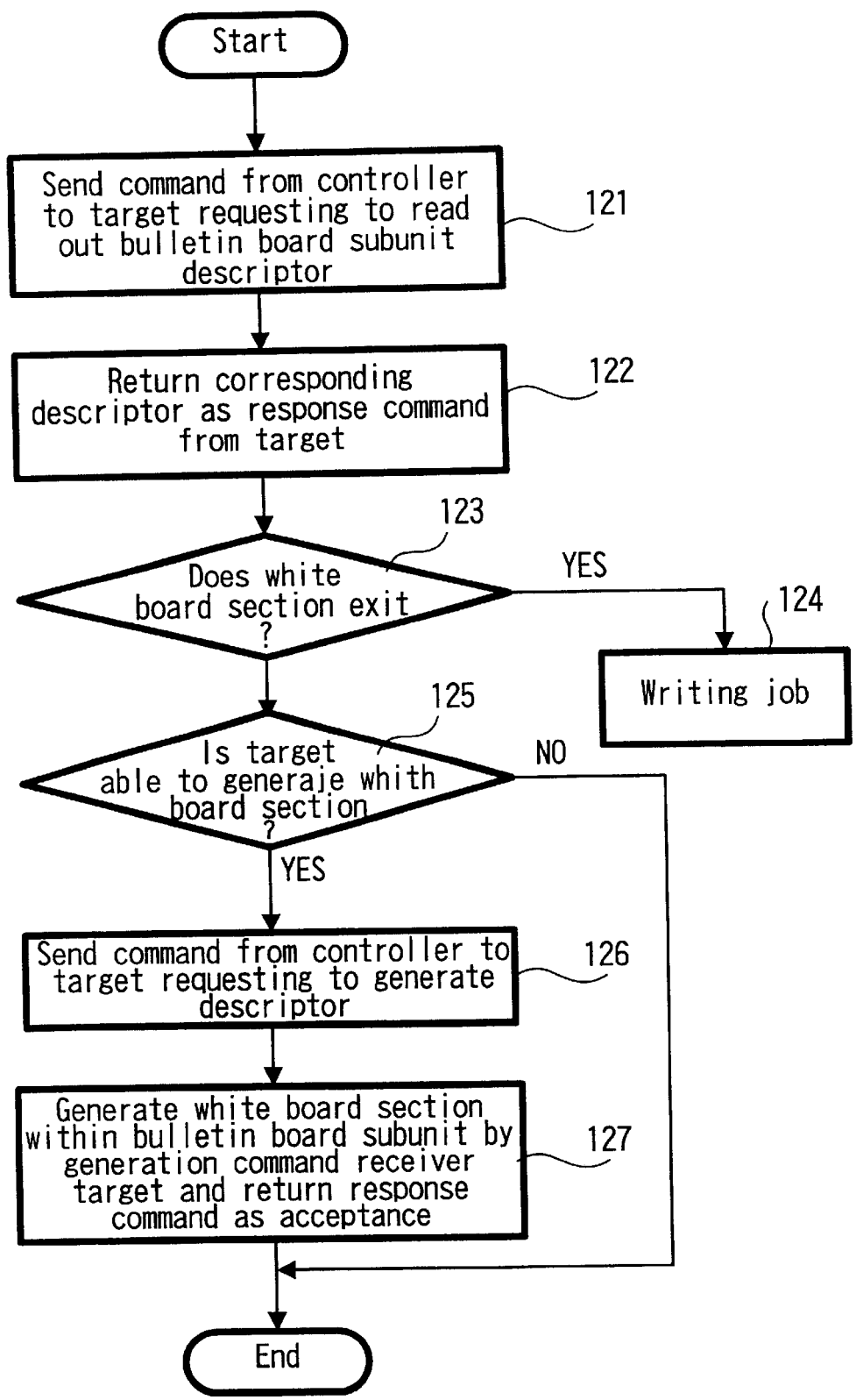
FIG. 10 is a flowchart detailing an example of a preparation processing procedure of the white board section in accordance with one embodiment of the present invention.

Next, the following description will describe, with reference to the flowchart in FIG. 10, the job procedure for generating the white board section in the target device under the control of the controller device when the white board section has not been generated in the bulletin board subunit in the target device. The controller device sends a command to the target device, requesting to read out the descriptor of the bulletin board subunit (Step 121). Upon receipt of the command, the target device returns the data on the corresponding descriptor in the form of a response command (Step 123). Here, the controller device checks the returned data of the descriptor, and judges whether or not there is the white board section in the bulletin board subunit (Step 124). When the existence of the white board section is judged, the writing job is effected to the white board section (Step 124). The writing job is carried out in the same manner as was explained with reference to the flowchart in FIG. 8.

When the absence of the white board section is judged in Step 123, the controller device checks the content of the readout descriptor (Implementation Profile ID or the like), and judges whether the target device is able to generate the white board section (Step 125). When the target device is judged as not being able to generate the white board section, the controller device terminates the job.

When the target device is judged as being able to generate the white board section in Step 125, the controller device sends a command to the target device, requesting to generate the descriptor (Step 126). Upon receipt of the generation command, the target device generates one white board section out of the board sections within the bulletin board subunit, and when the generation is completed, the target device returns [ACCEPTED] as the response command to the controller device to inform that the job at the command has been effected (Step 127), whereupon the controller device terminates the generating job.

In this manner, by generating at least one white board section out of the board sections within the bulletin board subunit, and allowing the other bus-linked devices to write/read data to/from the white board section without any restriction, all the data can be shared throughout the network linked via the bus. Thus, for example, by merely writing various kinds of data, such as the data related to the specifications as to by which hierarchical structure the data should be transmitted on the bus, data related to the other network structures, and data as to the connection status to the white board section, the transmission control within the network and the like can be effected in a satisfactory manner by referring to the data in the white board section. More specifically, when the controller device controls the transmission between the source device and destination device, and the necessary functions are not installed in the controller device, if the data related to the corresponding functions has been written to the white board section in any of the devices on the bus, the controller device can effect the transmission control by reading out that data.

The foregoing embodiment explained an example case using the network linked via the IEEE 1394 bus. It should be appreciated, however, that the data can be transmitted in the same manner among the devices linked to any other type of network.

Also, in the foregoing embodiment, the functions for running the jobs described as above are installed to each device. However, a program to run the data writing and reading jobs by the other devices by using the white board section generated in the bulletin board subunit, and the generating job of the white board section may be distributed to the users by means of providing medium, so that the user can load the program stored in the medium in the computer or the like to effect the similar functions. The providing medium referred to herein includes not only physical recording media, such as an optical disk and a magnetic disk, but also a medium that provides the program through communication means, such as the Internet.

With a communication method of a first aspect of the invention, arbitrary data can be written/read out to/from a predetermined storage region in at least one network-linked device under the control of the other devices. Thus, information related to an arbitrary function can be written to the storage region by the other devices, or the information on the function needed by the other devices can be read out from the storage region. Consequently, data can be shared throughout the network without any restriction.

With a communication method of a second aspect of the invention according to the first aspect, the storage region is set when a predetermined command is transmitted from any other device on the network. Consequently, the data writable/readable storage region can be set without any restriction under the control of any other device within the network.

With a communication method of a third aspect of the present invention according to the first aspect, the storage region is set by using one of boards that are set within a predetermined subunit defined by an AV/C command set. Consequently, the boards set within the subunit can be utilized efficiently.

With a communication apparatus of a fourth aspect of the present invention, arbitrary data can be written/read out to/from a predetermined storage unit under the control of any other network-linked device. Thus, information related to an arbitrary function can be written to the storage unit by the other devices, or the information on the function needed by the other devices can be read out from the storage unit. Consequently, data can be shared among the network-linked devices without any restriction by using the storage unit provided in the communication apparatus.

With a communication apparatus of a fifth aspect of the present invention according to the fourth aspect, data transmitted through the network is written to the storage unit when the control means judges transmission of a predetermined command through the network. Consequently, data transmitted from the other devices can be written to the storage unit in a reliable manner at the predetermined command.

With a communication apparatus of a sixth aspect of the invention according to the fourth aspect, predetermined data stored in the storage unit is sent to the network when the control means judges transmission of a predetermined command through the network. Consequently, data stored in the storage unit can be transmitted to the other devices in a reliable manner at the predetermined command.

With a communication apparatus of a seventh aspect of the invention according to the fourth aspect, a data storing region is secured in the storage unit when the control means judges transmission of a predetermined command through the network. Consequently, a region to/from which data can be written/read out without any restriction is secured at the predetermined command from the other devices.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A communication method for allowing communications among a plurality of devices linked to a predetermined network, comprising the steps of:

providing one of said plurality of devices linked to said predetermined network with a plurality of boards where data are read out from when a predetermined command is transmitted from an other one of said plurality of devices linked to said predetermined network, wherein data of a predetermined type is stored in each of said plurality of boards;

providing one of said plurality of devices linked to said predetermined network with a writable storage region to/from which data is written/read out when said predetermined command is transmitted from said other one of said plurality of devices linked to said network;

setting said writable storage region by using one of said plurality of boards that are set within a predetermined sub-unit defined by an AV/C command set;

using said plurality of boards to allow data sharing by said plurality of devices linked to said predetermined network; and using said writable storage region to allow data exchange throughout said predetermined network.

2. The communication method according to claim 1, further comprising the step of storing text data into said writable storage region.

3. The communication method according to claim 1, further comprising the step of storing graphic data into said writable storage region.

4. A communication device linked to a predetermined network formed of a plurality of devices, comprising:

storage means for providing one of said plurality of devices linked to said predetermined network with a plurality of boards where data are read out from when a predetermined command is transmitted from an other one of said plurality of devices linked to said predetermined network, wherein data of a predetermined type is stored in each of said plurality of boards;

a writable storage region included in one of said plurality of devices to/from which data is written/read out when said predetermined command is transmitted from said other device linked to said predetermined network; and control means for setting said writable storage region by using one of said plurality of boards that are set within a predetermined sub-unit defined by an AV/C command set, for using said plurality of boards to allow data sharing by said plurality of devices linked to said predetermined network, and for using said writable storage region to allow data exchange throughout said predetermined network.

5. The communication apparatus according to claim 4, further comprising storing means for storing text data into said writable storage region.

6. The communication apparatus according to claim 4, further comprising storing means for storing graphic data into said writable storage region.

* * * * *